(12) United States Patent
Nanda et al.

(10) Patent No.: US 10,990,486 B2
(45) Date of Patent: Apr. 27, 2021

(54) DATA STORAGE SYSTEM WITH REPAIR OF MID-LEVEL MAPPING BLOCKS OF INTERNAL FILE SYSTEM

(71) Applicant: EMC IP Holding Company LLC, Hopkinton, MA (US)

(72) Inventors: Kumari Bijayalaxmi Nanda, Edison, NJ (US); Dixitkumar Patel, Monroe, NJ (US); Soumyadeep Sen, Highland Park, NJ (US); Rohit K. Chawla, Scotch Plains, NJ (US); Alexander S. Mathews, Morganville, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 168 days.

(21) Appl. No.: 16/399,028

(22) Filed: Apr. 30, 2019

(65) Prior Publication Data
US 2020/0349032 A1 Nov. 5, 2020

(51) Int. Cl.
*G06F 11/14* (2006.01)
*G06F 12/1009* (2016.01)

(52) U.S. Cl.
CPC ...... *G06F 11/1469* (2013.01); *G06F 12/1009* (2013.01); *G06F 2201/84* (2013.01)

(58) Field of Classification Search
CPC .. G06F 11/1469; G06F 11/3037; G06F 11/08; G06F 12/1009; G06F 2201/84; G06F 16/188; G06F 16/192; G06F 16/9027
See application file for complete search history.

(56) References Cited

U.S. PATENT DOCUMENTS

| 7,475,277 | B1 | 1/2009 | Holdman et al. |
| 7,506,213 | B1* | 3/2009 | Cabrera, III ........ G06F 11/0727 714/26 |
| 7,546,319 | B1 | 6/2009 | Srinivasan et al. |
| 7,945,726 | B2 | 5/2011 | Faibish et al. |
| 8,843,533 | B1 | 9/2014 | Sukumar et al. |
| 2009/0271659 | A1 | 10/2009 | Troppens et al. |
| 2012/0221523 | A1* | 8/2012 | Bendakovsky ..... G06F 11/1458 707/640 |
| 2018/0018218 | A1* | 1/2018 | Rat ...................... G06F 11/1004 |

FOREIGN PATENT DOCUMENTS

WO 2010050944 5/2010

* cited by examiner

*Primary Examiner* — Bryce P Bonzo
*Assistant Examiner* — Albert Li
(74) *Attorney, Agent, or Firm* — BainwoodHuang

(57) ABSTRACT

A technique for repairing an indirect addressing structure of a file system damaged by corruption of a mid-level mapping (MID) page includes scanning selected leaf pages to identify leaf pages associated with the corrupted MID page, then recreating the MID page by recreating pointers to the identified leaf pages. The scanning includes (1) based on an association of groups of leaf pages with corresponding sets of families of storage objects, scanning the leaf pages of only those groups of leaf pages associated with the family of storage objects for the corrupted MID page. The scanning further includes (2) performing a two-pass process including first identifying all leaf pages for the logical offset range of the corrupted MID page and then pruning those identified leaf pages that are reachable via non-corrupted MID pages, yielding the leaf pages for the corrupted MID page only, usable to recreate the corrupted MID page.

20 Claims, 6 Drawing Sheets

DATA STORAGE SYSTEM WITH REPAIR OF MID-LEVEL MAPPING BLOCKS OF INTERNAL FILE SYSTEM

BACKGROUND

The present invention relates to the field of file systems, in particular to large file systems used in data storage systems for organizing storage the data of logical storage objects such as volumes. Even more particularly, it relates to techniques for repairing damage to an indirect addressing tree of the file system that occurs during operation.

SUMMARY

A technique is disclosed for repairing an indirect addressing structure of a file system that has been damaged by corruption of a mid-level mapping (MID) page providing a middle-level mapping of data of a set of files used to store a family of storage objects, where the file system also includes leaf pages associated with respective MID pages and providing a lower-level mapping of file system data. The technique includes scanning selected leaf pages to identify leaf pages associated with the corrupted MID page. The scanning includes (1) based on an association of groups of leaf pages with corresponding sets of families of storage objects, scanning the leaf pages of only those groups of leaf pages that are associated with the family of storage objects for the corrupted MID page. The scanning further includes (2) performing a two-pass process including first identifying all leaf pages for the logical offset range of the corrupted MID page, which will include leaf pages for both the corrupted MID page and other, non-corrupted MID pages. Then those identified leaf pages that are reachable via the non-corrupted MID pages are pruned, yielding a set of resulting leaf pages for the corrupted MID page only. A replacement MID page is created by incorporating pointers to the resulting leaf pages into the replacement MID page, and the replacement MID page is incorporated into the indirect addressing structure in place of the corrupted MID page.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
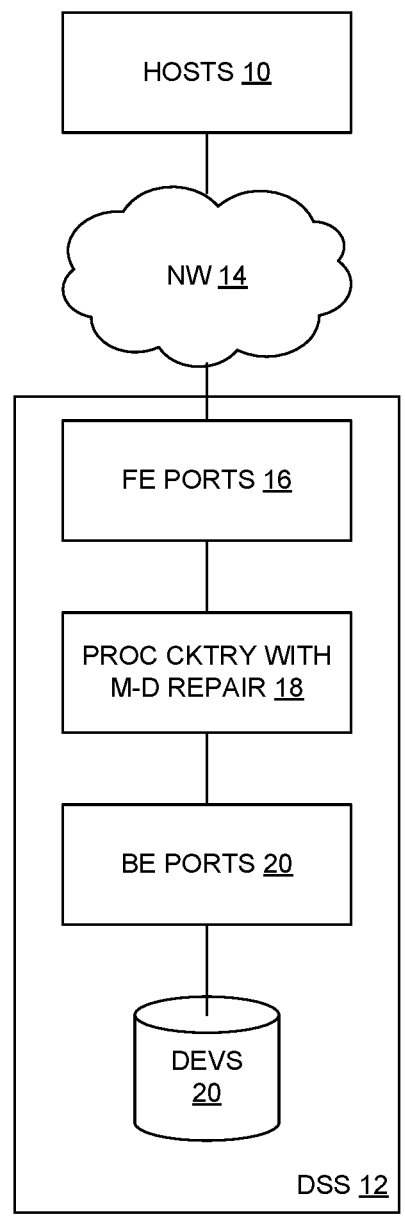
FIG. 1 is a block diagram of a data processing system including a data storage system employing a technique of repairing VDB page corruption as described herein.

In a global file system (FS) forming part of a logical mapper in a data storage system, logical pages called IDP Pages maintain information to track shared blocks among storage volumes in the same family (e.g., LUNs, snapshots and thin clones). Since the scope of the FS is global and there could be sharing of blocks within/across families because of de-duplication, it can be challenging to reduce the scope of metadata check and repair to an isolated portion of the mapper tree structure. Due to the large size of the file system, the large scope makes the metadata check and repair slow, unwieldy and inefficient.

Described herein is a technique in which certain additional metadata is maintained in an on-disk mapping structure, and mechanisms use the metadata to perform more targeted check and repair working with a reduced portion of the mapping tree. By this technique, certain block-sharing related metadata corruptions can be isolated for repair, making the repair process more efficient and leaving remaining portions of the tree usable and avoiding the need to take the entire mapper offline.

In particular, the technique relates to repair of corruption to certain mid-level mapping pages called "MIDs" that reside at a middle level of the mapping tree and point to lower-level pages called "Leafs". For normal operation, Leafs are selected and used based on being referenced by a corresponding MID in a top-down traversal of the mapping tree. For purposes of repair as described herein, groups of Leafs maintain an identification of those families of storage objects that the Leafs are part of During a repair operation, this family identification is used to limit the scope of scanning for Leafs that must be accounted for in rebuilding a corrupted MID, improving efficiency of the rebuilding operation.

Leafs store information associating them with corresponding MIDs in the form of Family ID and volume logical offset. This information is added during the first writing of each Leaf page in the write path where both the Family ID and volume logical offset information are available. Family ID remains same for the life cycle of the Leaf Page because there is no sharing for owned pages across families. Volume logical offset also remains same for the life cycle of the Leaf Page through merge operations (e.g., snapshot sharing merge operation that folds an orphaned shared parent with its only living child IDP Page).

A list of Family IDs is maintained in a metadata section of large segments called "Ubers" that store chunks of the file system metadata pages (Leafs, Mids and others). The Family IDs identify all families that are consuming metadata pages from this Uber. Opportunistic allocation logic is used to keep the list limited as much as possible, i.e.:

a. The information is updated when a new page is allocated that may belong to a family other than the existing consumers from this Uber as described by the list.

b. If the file system has abundant free metadata pages available, new metadata page allocation for a new family tries favors creating a new Uber or finding an existing Uber with plenty of space available. New metadata page allocation for an existing family tries to find an Uber that already hosts pages belonging to this family.

c. Preferably an in-memory copy of the family ID list is maintained for hot metadata Ubers (that have plenty of space available) so that the list can be referred to during metadata page allocation with minimal additional processing cost.

Certain mechanisms use the above structure to do targeted check and repair. In particular, when a corrupted MID is discovered during normal IO processing, a background check and repair process can be invoked. Essentially the process first identifies all Leafs to which the corrupted MID pointed, then recreates pointers for those Leafs and creates a replacement MID using the recreated pointers. This task starts with identifying all Leafs for all the volumes in the family that correspond to the logical offset range that the corrupted MID was covering, then pruning this set of Leafs to remove those pointed to by non-corrupted MIDs. Operation includes a limitation on the scope of the search for Leafs, because in a large file system that search could potentially require scanning many millions of LEAFs, representing inefficient use of processing resources.

In one example the following approach is used:

A. Pass the information from a failed IO request regarding the volume ID, family ID and logical offset for the faulted MID B. Get the volume list for the family by scanning modes in the file system namespace C. Make a list of all leaf page addresses that point to the same logical offset range for the family. The limitation to the particular family is realized using the family list of the Ubers—only the Leafs in those Ubers storing metadata for the particular family need to be scanned, and other Ubers can be skipped entirely. This may reduce the scope of the scanning by one or more orders of magnitude.

D. Maintain key-value pairs in a LeafTable bookkeeping data structure<Leaf address found in C above, volume ID found for the leaf page>

E. Browse the corrupted logical offset from each of the non-faulted volumes of the family by following the mapping and remove the key-values pairs from the LeafTable for the ones that belong to same logical offset range The remaining leaf pages in the LeafTable that point back to the faulted logical offset range are used to reconstruct the faulted MID.

Embodiments

FIG. 1 shows a data processing system 10 in which a plurality of host computers (HOSTS) 10 access secondary storage provided by a data storage system (DSS) 12 via a network 14. As shown, the data storage system 12 includes front-end interface circuitry or ports (FE PORTS) 16, processing circuitry (PROC CKTRY) 18, back-end interface circuitry or ports (BE PORTS) 20 and secondary-storage devices (DEVs) 22. The processing circuitry 18 includes particular functionality for repairing metadata (M-D) of an internal file system, as described more herein.

In operation, the hosts 10 issue secondary storage data requests (reads, writes) for data stored on the devices 20. These requests are generally referred to as "I/O requests" herein. The I/O requests are communicated from the hosts 10 to respective ports 16 of the DSS 12 by the network 14. The processing circuitry 18 processes each I/O request and returns an appropriate response. In the case of reads, the response generally includes the requested data (absent a failure or other abnormal condition), and for writes the data is written to respective drives 20 and a "write complete" response is returned. The processing circuitry 18 may maintain and utilize a semiconductor "device cache" to cache selected data of the drives 20, as generally known in the art. Thus read data may come from the cache (for a hit) or from a device 20 (cache miss). For a write, the write data may be stored into the cache initially, then later de-staged to a device 20.

Figure 2:
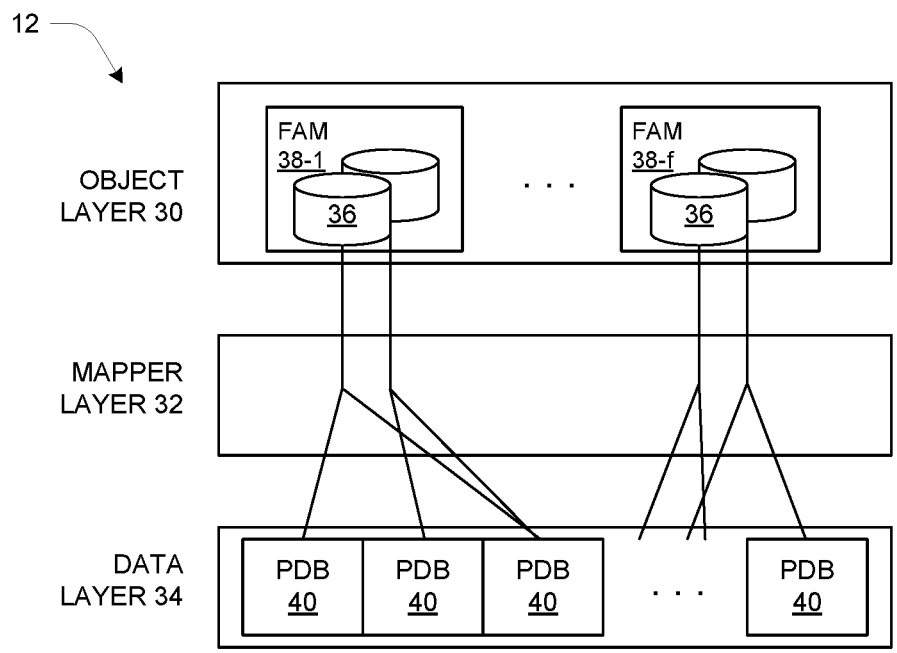
FIG. 2 is a logical/functional block diagram of the data storage system.

FIG. 2 is a functional/logical view of certain aspects of the data storage system 12. It will be appreciated that much of the functionality is realized by software executed by the processing circuitry 18, apart from the physical storage of data which is provided by the devices 20. In the view of FIG. 2 there are three functional layers—an object layer 30, a mapper layer 32 and a data layer 34. These are described in turn.

The object layer 30 establishes and maintains logical views of the secondary storage that are referred to as volumes 36, and presents the volumes 36 to the hosts 10 (FIG. 1) as the objects of storage operations (e.g., reads and writes). The volumes 36 are organized into families 38 (shown as FAM 38-1, FAM 38-f). In one embodiment, the volumes 36 of a family 38 include a current or "primary" volume 36 and a collection of point-in-time copies of that primary volume, referred to as "snapshot" volumes 36 (or simply "snapshots" or "snaps"). A given snapshot is obtained from an existing version of the primary volume, which may either the primary volume itself or another snapshot that was obtained earlier. In this description, the term "source" is used to identify the volume whose snapshot was taken to obtain a snapshot volume 36.

The data layer 34 maintains the actual data for the volumes 36, as respective collections of physical data blocks (PDBs) 40. As explained more below, the PDBs 40 are data blocks of an internal file system of the mapper layer 32. In one embodiment the PDBs 40 are of a fixed size such as 2 MB, and include additional sub-structure as described below. In this case a PDB may contain up to 512 uncompressed 4 KB pages of data. Other structures are possible. The PDBs 40 may be stored in any of a variety of ways on a set of nonvolatile secondary storage media, such as magnetic media, flash-programmable semiconductor media (Flash), etc. Moreover, there may be additional layers of logical structure that translate between the PDB-view of the data and actual physical storage as provided by physical storage devices. For example, in one embodiment, raw physical storage provided by storage devices may be carved into large extents from which are served block-sized units for allocation to the volumes 36 and storage of the corresponding data. Such lower-level details are outside the scope of the present description.

The mapper layer 32 is responsible for translating between the logical-volume view of the object layer 30 and the PDB structuring of the data layer 34. As shown in simplified form, each volume 36 is mapped to a corresponding collection of PDBs 40 by the mapper layer 32. As also simply illustrated, in some cases a given PDB 40 may belong to more than one volume 36, i.e., the mapper layer 32 may map logical data blocks of multiple volumes 36 to the same PDB 40. This feature is referred to as "block sharing" herein, and is used in support of snapshot functionality, for example. For snapshotting, rather than completely duplicating the entirety of a source volume 36, a snapshot volume 36 can be organized primarily as a logical structure with block storage for only those blocks that are modified or in addition to the blocks of the source (where "source" refers to the volume 36 whose snapshot is being taken). The mapping for a snapshot volume 36 points to the same PDBs 40 as the source volume 36 for all original, unmodified blocks. It also has pointers to other PDBs 40 that store the snapshot version of source blocks that have been modified or deleted from the source during ongoing operation.

The mapper layer 32 also provides additional logic in support of services such as data compression and deduplication, which generally rely on data sharing at a finer grain. This additional logic is described below.

Figure 3:
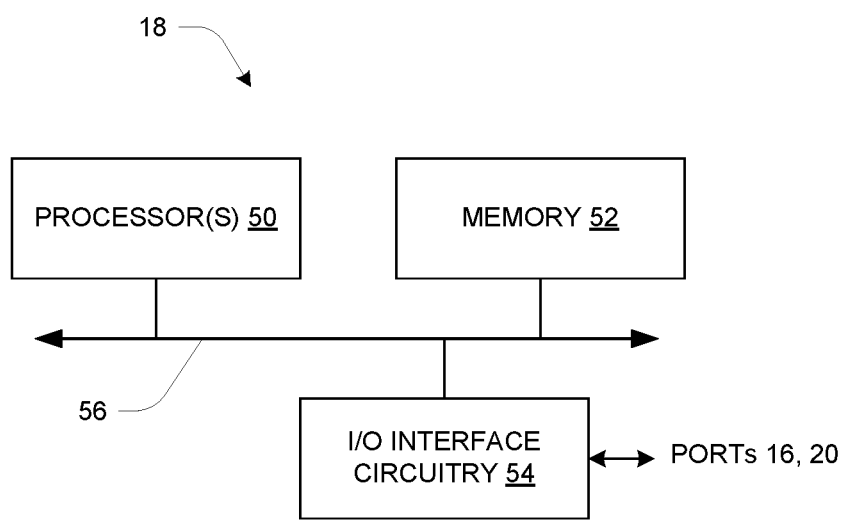
FIG. 3 is a block diagram of processing circuitry from a hardware perspective.

FIG. 3 shows an example configuration of the processing circuitry 18 from a computer hardware perspective. The hardware includes one or more processors 50, memory 52, and interface circuitry 54 interconnected by data interconnections 56 such as one or more high-speed data buses. The interface circuitry 54 provides hardware connections to the ports 16, 20 (FIG. 1) and perhaps other external devices/connections. The processor(s) 50 with connected memory 52 may also be referred to as "processing circuitry" herein. In operation, the memory 52 stores data and instructions of system software (e.g., operating system) and one or more application programs which are executed by the processor(s) 50 to cause the hardware to function in a software-defined manner. The application software may be stored on a non-transitory computer-readable medium such as an optical or magnetic disk, Flash memory or other non-volatile semiconductor memory, etc., from which it is retrieved for execution by the processing circuitry, as generally known in the art.

Figure 4:
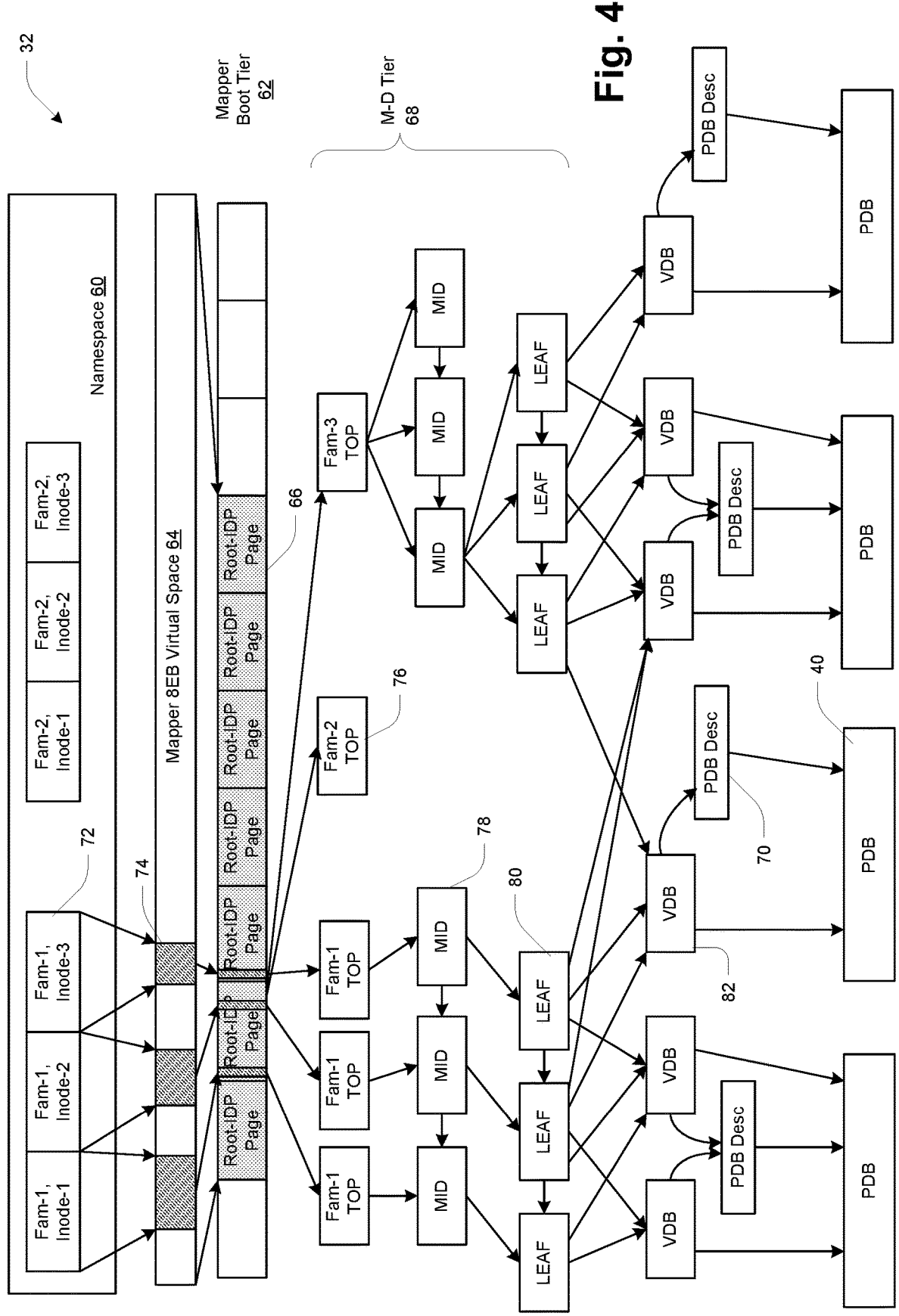
FIG. 4 is a schematic diagram of a mapper file system.

FIG. 4 illustrates details of the mapper layer 32, which is structured as a file system. At a high level it is organized into a namespace 60, a mapper boot tier 62 which has a large virtual address space 64 (e.g., 8 EB (exabytes)) and a set of Root-Idp pages 66, and a metadata (M-D) tier 68. Also shown are the PDBs 40 of the data layer, along with associated PDB descriptors (Desc) 70. The namespace layer 60 includes Modes 72 that map abstract volume identifiers to corresponding extents 74 of the virtual space 64. Each Mode 74 corresponds to a respective volume 36 (FIG. 3), and the Modes 74 are grouped into families (e.g., Family 1 and Family 2) as shown. The extents 74 are mapped to corresponding sets of PDBs 40 by the remaining structure, as described further below after a brief description of FIG. 5.

Figure 5:
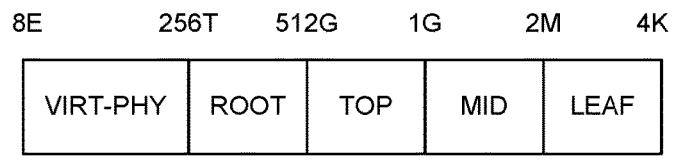
FIG. 5 is a schematic diagram of virtual address segmentation in the file system.

FIG. 5 illustrates a logical segmentation of the virtual address space 64 as expressed in the structure of FIG. 4. A block address is segmented into distinct portions shown as leaf, mid, top, root and virt-phy, from least to most significant, where all but the virt-phy cover regions that are successive multiples of 512 in size. A given leaf value (leaf offset) identifies a single 4 KB block in a specific 2 MB range; a given mid value identifies a single 2 MB sub-range of a specific 1 GB range, and so on. At the highest level, a virtual-to-physical (virt-phy) mapping maps a given extent 74 to a specific 256 TB range as well as to one or more 512 GB sub-regions thereof, as explained more below.

Returning to FIG. 4, the address structure of FIG. 5 is reflected in the structure of the mapper boot tier 62 and metadata tier 68. The Root-Idp pages 66 have 512 pointers each, as do the top-level pages (TOP) 76, mid-level pages (MID) 78, and leaf pages (LEAF) 80. Starting at the upper level, individual extents 74 which correspond to modes 72 are mapped to corresponding sets of Root-Idp pointers of the Root-Idp pages 66, where each Root-Idp pointer points to a respective top-level (TOP) page 76. This mapping is the virtual-to-physical mapping discussed above, and is indicated in FIG. 4 as a set of arrows between the virtual space 64 and the mapper boot tier 62. Because of this relatively coarse mapping of an extent 74, each volume 36 as a practical matter is constrained to have a size that is a multiple of 512 GB (the region size mapped by a TOP 76). In alternative embodiments, other structure may be used to provide finer or coarser size resolution as may be desired.

Proceeding downward, each TOP 76 has up to 512 pointers to respective MIDs 78; and each MID 78 has up to 512 pointers pointing to respective LEAFs 80. The LEAFs 80 have pointers to virtual data blocks (VDBs) 82 and entries thereof, as explained more below. The VDBs 82 provide a level of indirection between the lowest-level mapping of the LEAFS 80 and the PDBs 40 storing the actual data. This indirection provides support for services such as data de-duplication, as explained more below. As shown, a VDB 82 also points to the PDB descriptor 70 of the PDB 40 to which the VDB 82 points. Additionally, the PDB descriptor 70 preferably includes a back-pointer pointing back to the associated VDB 82, for purposes of repair/recovery as described below.

In operation, a data request is directed to a particular volume 36 and range of logical addresses thereof, also referred to as "offsets". To access volume data, an mode 72 is selected based on the identity of the volume being accessed. The mode selection results in identification of the associated extent 74 and a set of entries (pointers) of a corresponding Root-Idp page 66. For a volume of less than 512 GB, the ROOT and TOP address segments together specify a particular TOP 76 and MID 78. Larger volumes may have multiple Root-Idp pointers identifying multiple MIDs 78. The MID address segment specifies an individual pointer in a MID 78 that points to a corresponding LEAF 80, and similarly the LEAF address segment specifies a specific VDB 82 and the PDB 40 to which it points, as well as individual VDB and PDB entries. Additional aspects of operation are described below.

All of the structure of FIG. 4 is so-called "on-disk" structure, i.e., stored persistently on the same non-volatile storage media that constitutes the devices 20 (FIG. 1). At any given time, some of this structure may also be resident in system memory to promote faster operation. There may be an in-memory "metadata cache" for caching such in-memory portions of the structure, and various functions and rules for managing the metadata cache to optimize performance and robustness/resilience. Such techniques are generally known and not elaborated herein.

Figure 6:
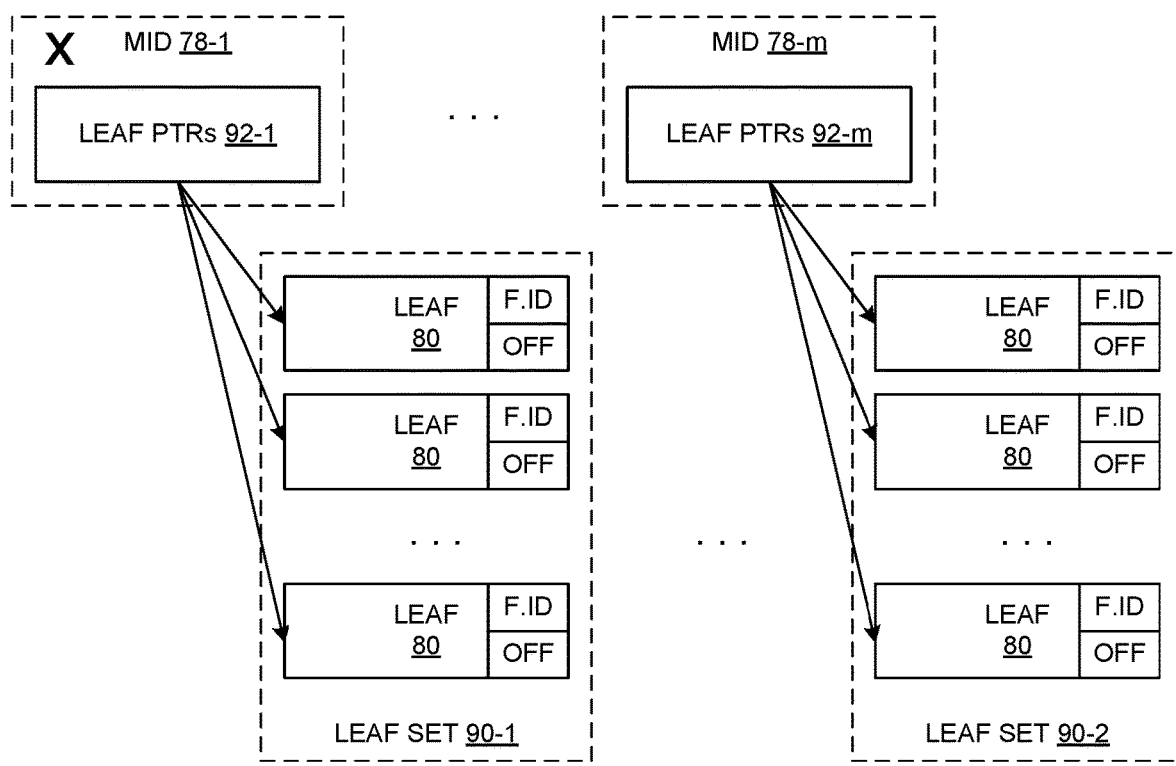
FIG. 6 is a schematic diagram illustrating relationships among MID and LEAF pages.

FIG. 6 illustrates pertinent details of structure and relationships of MIDs 78 and LEAFs 80, in particular for two MIDs 78-1, 78-2 and respective sets 90-1, 90-2 of LEAFs 80. First, some general characteristics are explained, then additional details are assumed that set context for the repair technique described further below.

In general, each MID 78 contains a set of LEAF pointers (PTRs) 92, each pointing to a respective LEAF 80. In general, a LEAF set 90-$m$ is the set of all LEAFs 80 pointed to by pointers 92-$m$ of MID 78-$m$, for all MIDs 78-1, . . . , 78-$m$. As shown, each LEAF 80 includes, in addition to pointers to VDBs 82 as discussed above with reference to FIG. 4 (not shown in FIG. 6), certain metadata including a family identifier (FAM ID) and a volume logical offset (OFF). The family identifier identifies the specific family 38 (FIG. 2) to which the LEAF 80 (and its associated MID 78) belongs, and the offset identifies the address-based position of this LEAF 80 in the volume 36 that contains it, i.e., the address of the specific 2 MB region of this LEAF 80 in the volume 36. In general for a given family 38 there may be a very large number of MIDs 78 and a corresponding large number of LEAFs 80. Additionally, for each LEAF 80 of a set (e.g. 90-1) for a corrupted MID (e.g., 78-1), there may be a significant number of LEAFs 80 in other sets 90 that are "same-offset" LEAFs 80, i.e., that have the same logical offset value albeit for other volumes 36 of the family. This feature comes into play in the repair process as described below.

FIG. 6 generally represents relationships of MIDs 78 and associated LEAFs 80 for all volumes 36 and families 38 supported by the mapper file system 32. Further below is a description of an example with reference to FIG. 6 with an assumption that its elements belong to a single family 38, in which case the family ID in all the LEAFs 80 is the same. That example is used to describe the disclosed repair technique. Also, as indicated by the large "X" on MID 78-1 in FIG. 6, in that example it is assumed that the MID 78-1 is the one identified as corrupted and thus the subject of the repair operation.

LEAFs 80 store associations with corresponding MIDs 78 in the form of FamilyID and Volume logical offset, as illustrated in FIG. 6. This information is added during the first writing of each LEAF 80 in the write path where both the family ID and volume logical offset information are available. FamilyID remains same for the life cycle of the LEAF 80 because there is no sharing for owned LEAFs 80 across families 38. Volume logical offset also remains same for the life cycle of the LEAF 80 through merge operations (e.g., snapshot sharing merge operation that folds an orphaned shared parent with its only living child LEAF).

Figure 7:
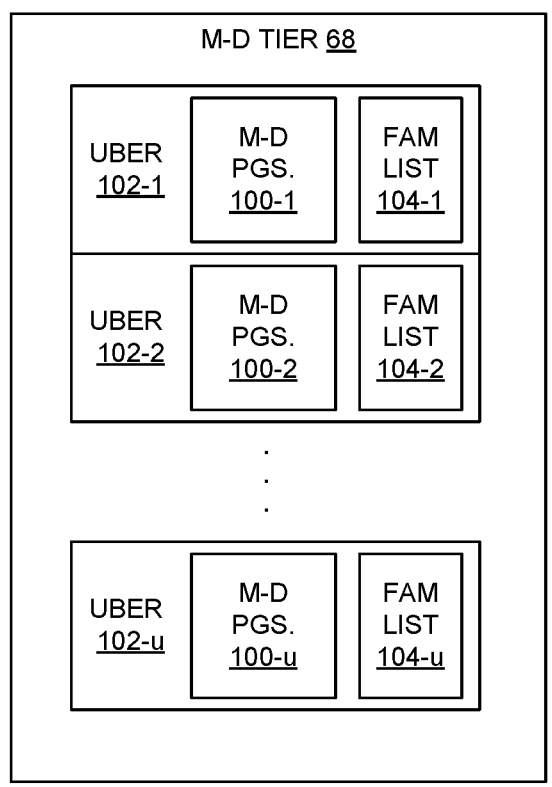
FIG. 7 is a schematic diagram of a layout of a metadata tier.

FIG. 7 illustrates another view of the metadata tier 68, showing how the collection of metadata elements (TOPs 76, MIDs 78 and LEAFs 80) are stored in an otherwise unstructured storage area. In this view, metadata elements 76, 78 and 80 are stored in groups shown as "metadata pages" (M-D PGs) 100, which are included in a succession of segments called "Ubers" 102 (102-1, 102-2, . . . ). In one embodiment, each Uber 102 is a segment having a size of 4 GB, and is the unit of allocation of storage space for the metadata elements 100 as the metadata tier 68 of the file system grows during operation. As shown, each Uber 102 also includes a respective family list (FAM LIST) 104, which contains identifiers of all the families 38 for which this Uber 102 stores any metadata pages, including of course any LEAFs 80. This information is used to limit the scope of scanning during the repair operation as described below.

As mentioned above, opportunistic allocation logic is used to keep the family list 104 for each Uber 102 as limited as possible (or more specifically, to pack the metadata pages for families into as few Ubers 102 as possible, thus minimizing the scope of scanning during repair). In one embodiment, such logic may include the following:

a. The family information 104 is updated when a new LEAF 80 is allocated that may belong to a family 38 other than those already consuming from this Uber 102 as described by the list 104.

b. If the file system has abundant free space available for the metadata tier 68, new metadata page allocation for a new family 38 favors either creating a new Uber 102 or finding an existing Uber 102 with plenty of space available. New metadata page allocation for an existing family 38 tries to find an Uber 102 that already hosts pages 102 belonging to this family 38.

c. It should be possible to maintain an in-memory copy of the family list 104 for "hot metadata" Ubers (that have plenty of space available), so that the list can be referred to during metadata page allocation with minimal additional processing cost.

Figure 8:
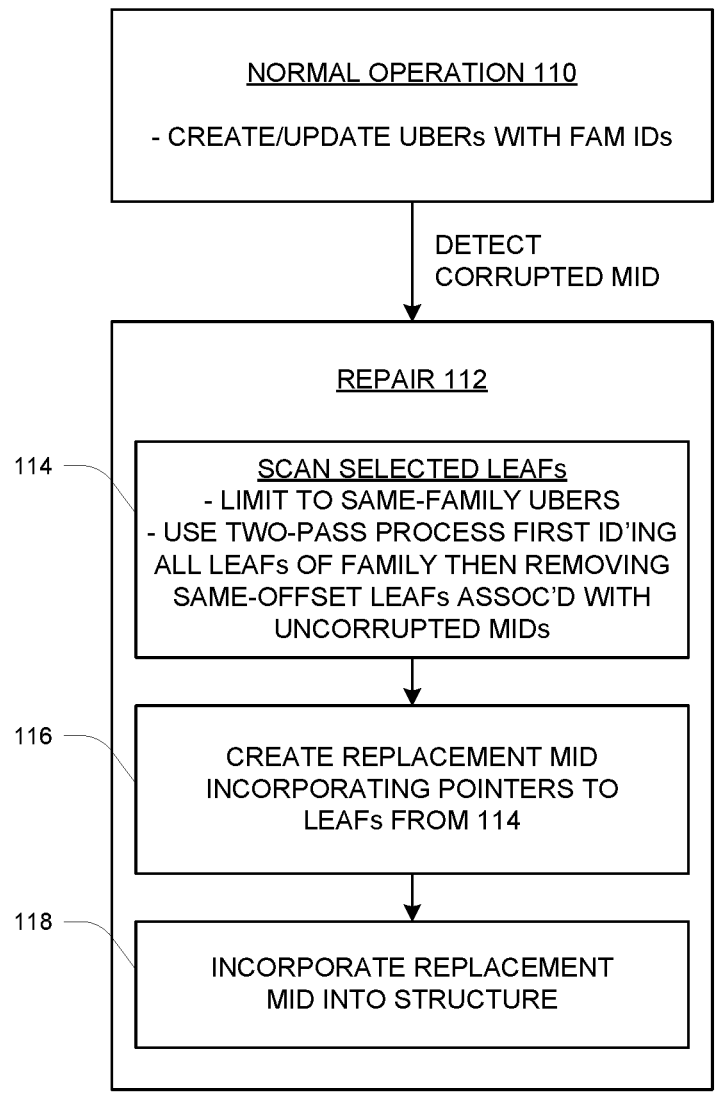
FIG. 8 is a flow diagram of pertinent operation including a metadata repair operation.

FIG. 8 illustrates pertinent operation including the repair process that has been mentioned above. The description refers to an example with reference to FIG. 6 as explained above, i.e., taking all elements as being of a single family 38 and taking the MID 78-1 as the corrupted MID 78.

At 110, normal operation occurs in which the data storage system 12 processes host I/O requests by writing/reading data to/from the devices 20. In these operations the data storage system 12 both uses and maintains the file-system structure (FIG. 4) of the mapper layer 32 and the Uber structuring of the metadata tier 68 as shown in FIG. 7. In particular, as LEAFs 80 are created for respective families 38, corresponding family identifiers are added to the family lists 104 of the respective Ubers 102 that contain the new LEAFs 80, and the family identifiers and volume logical offsets are also added to the new LEAFs 80. This normal operation results in the situation of FIG. 6, in which the metadata pages for a given family 38 include a set of MIDs 78 and corresponding sets 90 of LEAFs 80, all with the same Family ID and generally including some number of same-offset LEAFs 80, as explained above.

A repair operation 112 is initiated upon detecting a corrupted MID 78 during the normal operation 110. Here the term "corrupted" signifies any condition that makes the MID 78 unusable for normal operation. True data corruption may have occurred, i.e., an erroneous modification of its contents, or other conditions may have somehow made the MID 78 inaccessible or otherwise unusable. It should be noted that the disclosed technique assumes failure of only one MID 78 of a given family 38; multiple-failure scenarios are not specifically described herein although they may be supported by suitable augmentation of the disclosed technique. In this example as shown in FIG. 6, MID 78-1 is discovered as corrupted. The repair operation 112 includes sub-steps 114, 116 and 118.

At 114, selected LEAFs 80 are scanned to identify LEAFs 80 associated with the corrupted MID 78 (e.g., 78-1). This scanning includes (1) based on an association of groups of LEAFs 80 with corresponding sets of families 38 of storage objects 36, scanning the LEAFs 80 of only those groups that are associated with the specific family 38 of storage objects for the corrupted MID 78. In one embodiment, the grouping of LEAFs 80 uses a structure like that of FIG. 7, i.e., storing LEAFs 80 in segments like Ubers 102 and using family lists 104 to enable selection of only those Ubers 102 storing LEAFs 80 for this family 38. More specifically, the LEAFs 80 for a given Uber 102 are scanned only if the family list 104 of the Uber 102 includes the family ID for the family of the corrupted MID 78.

The scanning at 114 further includes (2) performing a two-pass process that includes first identifying all LEAFs 80 for the logical offset range of the corrupted MID page as described above, many of these being associated with other MIDs 78 that are not corrupted, and then pruning those LEAFs 80 that are reachable (by traversing the IDP structure) via the non-corrupted other MIDs 78. The pruning yields a set of resulting LEAFs 80 for the corrupted MID 78 only. Referring to the example of FIG. 6, the first step of the scanning identifies all LEAFs 80 of all the sets 90 for MIDs 78 of the affected family. This generally includes many same-offset LEAFs 80. Then those LEAFs 80 that are reachable from intact MIDs 78 (i.e., for all but the corrupted MID 78-1) are pruned from the list. The result is the LEAFs 80 of only the leaf set 90-1 for the corrupted MID 78-1. Thus this leaf set 90-1 is arrived at by a subtractive method, first identifying all LEAFs 80 for the family 38 and then removing those LEAFs 80 that are still reachable by intact MIDs 78.

At 116, a replacement MID 78 is created by incorporating pointers to all the LEAFs 80 that have resulted from the scanning and pruning of step 114.

At 118, the replacement MID 78 is incorporated into the indirect addressing structure (FIG. 4) in place of the corrupted MID 78. This step includes updating the associated TOP pages 76 (FIG. 4) to point to the replacement MID 78 instead of the corrupted MID 78.

While various embodiments of the invention have been particularly shown and described, it will be understood by those skilled in the art that various changes in form and details may be made therein without departing from the scope of the invention as defined by the appended claims.

What is claimed is:

1. A method of repairing an indirect addressing structure of a file system that has been damaged by corruption of a mid-level mapping (MID) page providing a middle-level mapping of data of a set of files used to store a family of storage objects, the file system including leaf pages associated with respective MID pages and providing a lower-level mapping of file system data, comprising:
   scanning selected leaf pages to identify leaf pages associated with the corrupted MID page, the scanning including (1) based on an association of groups of leaf pages with corresponding sets of families of storage objects, scanning the leaf pages of only those groups of leaf pages that are associated with the family of storage objects for the corrupted MID page, and (2) performing a two-pass process including first identifying all leaf pages for the logical offset range of the corrupted MID page and then pruning those identified leaf pages that are reachable via non-corrupted MID pages for the logical offset range, the pruning yielding a set of resulting leaf pages for the corrupted MID page;
   creating a replacement MID page by incorporating pointers to the resulting leaf pages into the replacement MID page; and
   incorporating the replacement MID page into the indirect addressing structure in place of the corrupted MID page.

2. The method of claim 1, wherein the repairing method is initiated from normal operation in which a data storage system processes host I/O requests by writing/reading data to/from storage devices, the repairing method being initiated upon detection of the corruption of the MID page, the normal operation both using and maintaining indirect addressing structure by, as the leaf pages are added to the groups, adding corresponding family identifiers to family lists associated with the groups for use in limiting the scope of leaf page scanning in the repairing method.

3. The method of claim 1, wherein the MID and leaf structure is used in support of snapshot data sharing in which a data block shared between a source object and a snapshot object is mapped by a single leaf page pointed to by separate MID pages for the object and the snapshot object.

4. The method of claim 1, wherein the leaf pages point to respective data blocks storing underlying file system data.

5. The method of claim 4, wherein the leaf pages point to virtual data blocks (VDBs) providing a layer of indirection to corresponding physical data blocks (PDBs) that store the underlying file system data, the VDB-PDB structure used for data deduplication and compression.

6. The method of claim 1, wherein the repairing method is initiated from normal operation in which a data storage system processes host I/O requests by writing/reading data to/from storage devices, the normal operation including opportunistically allocating families to the groups to limit the number of groups used for each family and thereby limit the scope of scanning of leaf pages during the repairing method.

7. The method of claim 6, wherein the opportunistic allocating includes updating the family information of a group when a new leaf is allocated that may belong to a family other than the families already consuming metadata pages from the group.

8. The method of claim 6, wherein the opportunistic allocating includes (1) when allocating a new leaf page for a new family and when the file system has abundant free space available for metadata pages, favoring the creation of a new group or finding an existing group with a large amount of free space to allocate the new leaf page to, and (2) when allocating a new leaf page for an existing family, favoring the use of an existing group already hosting leafs for the family to allocate the new leaf page to.

9. The method of claim 6, further including maintaining an in-memory copy of a family list for hot-metadata groups to enable the family list to be referred to during leaf page allocation with minimal additional processing cost.

10. The method of claim 1, wherein the file system is part of a data storage system providing storage of a large number of logical storage objects presented to external host computers as storage volumes, and wherein the indirect addressing structure is used to map a large virtual space in which the storage objects are defined to corresponding sets of physical data blocks providing physical data storage.

11. A data storage system having processing circuitry defining and using an internal file system, the processing circuitry being configured and operative to store and execute computer program instructions to perform a method of repairing an indirect addressing structure of the file system that has been damaged by corruption of a mid-level mapping (MID) page providing a middle-level mapping of data of a set of files used to store a family of storage objects, the file system including leaf pages associated with respective MID pages and providing a lower-level mapping of file system data, including:
   scanning selected leaf pages to identify leaf pages associated with the corrupted MID page, the scanning including (1) based on an association of groups of leaf pages with corresponding sets of families of storage objects, scanning the leaf pages of only those groups of leaf pages that are associated with the family of storage objects for the corrupted MID page, and (2) performing a two-pass process including first identifying all leaf pages for the logical offset range of the corrupted MID page and then pruning those identified leaf pages that are reachable via non-corrupted MID pages for the logical offset range, the pruning yielding a set of resulting leaf pages for the corrupted MID page;
   creating a replacement MID page by incorporating pointers to the resulting leaf pages into the replacement MID page; and
   incorporating the replacement MID page into the indirect addressing structure in place of the corrupted MID page.

12. The data storage system of claim 11, wherein the repairing method is initiated from normal operation in which a data storage system processes host I/O requests by writing/reading data to/from storage devices, the repairing method being initiated upon detection of the corruption of the MID page, the normal operation both using and maintaining indirect addressing structure by, as the leaf pages are added to the groups, adding corresponding family identifiers to family lists associated with the groups for use in limiting the scope of leaf page scanning in the repairing method.

13. The data storage system of claim 11, wherein the MID and leaf structure is used in support of snapshot data sharing in which a data block shared between a source object and a snapshot object is mapped by a single leaf page pointed to by separate MID pages for the object and the snapshot object.

14. The data storage system of claim 11, wherein the leaf pages point to respective data blocks storing underlying file system data.

15. The data storage system of claim 14, wherein the leaf pages point to virtual data blocks (VDBs) providing a layer of indirection to corresponding physical data blocks (PDBs) that store the underlying file system data, the VDB-PDB structure used for data deduplication and compression.

16. The data storage system of claim 11, wherein the repairing method is initiated from normal operation in which a data storage system processes host I/O requests by writing/reading data to/from storage devices, the normal operation including opportunistically allocating families to the groups to limit the number of groups used for each family and thereby limit the scope of scanning of leaf pages during the repairing method.

17. The data storage system of claim 16, wherein the opportunistic allocating includes updating the family information of a group when a new leaf is allocated that may belong to a family other than the families already consuming metadata pages from the group.

18. The data storage system of claim 16, wherein the opportunistic allocating includes (1) when allocating a new leaf page for a new family and when the file system has abundant free space available for metadata pages, favoring the creation of a new group or finding an existing group with a large amount of free space to allocate the new leaf page to, and (2) when allocating a new leaf page for an existing family, favoring the use of an existing group already hosting leafs for the family to allocate the new leaf page to.

19. The data storage system of claim 16, wherein the method further includes maintaining an in-memory copy of a family list for hot-metadata groups to enable the family list to be referred to during leaf page allocation with minimal additional processing cost.

20. The data storage system of claim 11, wherein the file system is part of a data storage system providing storage of a large number of logical storage objects presented to external host computers as storage volumes, and wherein the indirect addressing structure is used to map a large virtual space in which the storage objects are defined to corresponding sets of physical data blocks providing physical data storage.

* * * * *